(12) United States Patent
Serrander et al.

(10) Patent No.: US 6,341,188 B1
(45) Date of Patent: Jan. 22, 2002

(54) METHOD AND ARRANGEMENT FOR INSTALLING OPTICAL FIBRE CABLE ELEMENTS

(75) Inventors: Hans Serrander, Stockholm; Göran Bäckström, Sundbyberg, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/433,937

(22) Filed: Nov. 4, 1999

(30) Foreign Application Priority Data

Nov. 5, 1998 (SE) .............................................. 9803774

(51) Int. Cl.[7] .................................................. G02B 6/44
(52) U.S. Cl. ........................................................ 385/114
(58) Field of Search ................................ 385/100, 102, 385/113, 109, 114, 106; 285/95

(56) References Cited

U.S. PATENT DOCUMENTS

| | | | |
|---|---|---|---|
| 5,011,332 A | | 4/1991 | Kunze et al. ............... 405/158 |
| 5,566,266 A | * | 10/1996 | Nave ............................ 285/95 |
| 5,615,293 A | * | 3/1997 | Sayegh ........................ 385/102 |
| 5,923,802 A | * | 7/1999 | Giebel et al. .................. 385/76 |
| 6,137,936 A | * | 10/2000 | Fitz et al. .................... 385/113 |
| 6,185,352 B1 | * | 2/2001 | Hurley ........................ 385/114 |

FOREIGN PATENT DOCUMENTS

| | | |
|---|---|---|
| DE | 4126559 | 2/1993 |
| FR | 2660790 | 10/1991 |

* cited by examiner

Primary Examiner—Akm E. Ullah
(74) Attorney, Agent, or Firm—Burns, Doane, Swecker & Mathis, L.L.P.

(57) ABSTRACT

The present invention relates to a method and to an arrangement for installing in a duct optical fiber cable elements, such as combined groups of optical fiber ribbon cables. In order to enable the cable element to be blown into a duct (11), an optical fiber ribbon cable body (1) that has electrical contact devices provided at one end thereof and which comprises a plurality of optical fiber ribbons (2) placed one upon the other has been held together with helically wound elastic tape (3) with successive turns of the tape mutually overlapping. The external helical cross-surface thus obtained can be acted upon by a by-passing air stream, such as to drive the cable body forwards in the duct.

8 Claims, 3 Drawing Sheets

METHOD AND ARRANGEMENT FOR INSTALLING OPTICAL FIBRE CABLE ELEMENTS

FIELD OF INVENTION

The present invention relates to a method of installing optical fibre cable elements, for instance combined groups of optical fibre ribbon cables, in ducts, and also to an arrangement for installing optical fibre ribbon cable elements, for instance combined groups of optical fibre ribbon cables, in ducts, for instance when installing such ribbon cables in duct systems that extend between a first collecting point for several subscriber optical fibre ribbon cables in an apartment building, tenement building or like multi-family building, and a second collecting point for further connection to one or more external fibre network systems.

DESCRIPTION OF THE BACKGROUND ART

It is known to install covered optical fibres in ducts by blowing air onto the fibres in order to lessen the strain on the fibres as they are installed. It is also known to blow optical fibre cables into ducts in order to install long, continuous lengths of optical fibre cables over long distances, such as to install optical fibre cables in so-called sub-ducts in kilometre lengths.

SUMMARY OF THE INVENTION

In order to enable fibre cable bodies fitted with electric contacts at one end to be installed in ducts, e.g. blown into said ducts, several optical fibre ribbons placed one upon the other to form an optical fibre ribbon cable body have been held together with the aid of an elastic tape which is wound helically around the optical fibre ribbons with a given overlap between successive turns. The helically overlapping elastic tape imparts to the cable body an external helical cross-sectional surface that can be acted upon by a passing air stream so as to cause the cable body to move in a desired direction in the duct in which it is to be installed. In addition to holding the fibre ribbon cables together, the tape wound around said body also enables the body to be driven forwards by the air. Alternatively, an optical fibre cable can be provided with a helically wound tape with a given overlap between successive turns, wherewith the resultant helically formed cross-sectional surface enables the cable to be propelled in a duct through the action of a by-passing air stream on said cross-sectional surface.

An optical fibre ribbon cable body that is fitted with electrical contact devices on one end can be installed conveniently over shorter distances, e.g. distances shorter than 300 metres. The invention avoids the necessity for extra splices and joins in conjunction with the installation of a blown fibre ribbon cable body or an optical fibre cable and also enables cost-effective and smooth installation of optical fibres to be achieved. The inventive method enables an optical fibre ribbon cable body to be fed into or blown into a hollow tubular section that has already been installed without danger of the positions of the ribbons being changed to any great extent in curved duct portions, and also enables a cable construction to be obtained in a relatively simple manner and at a cost which is lower than the cost incurred with a conventional cable that has a similar fibre content.

The invention will now be described in more detail with reference to a preferred embodiment thereof and also with reference to the accompanying drawings.

DESCRIPTION OF PREFERRED EMBODIMENTS

Figure 1:
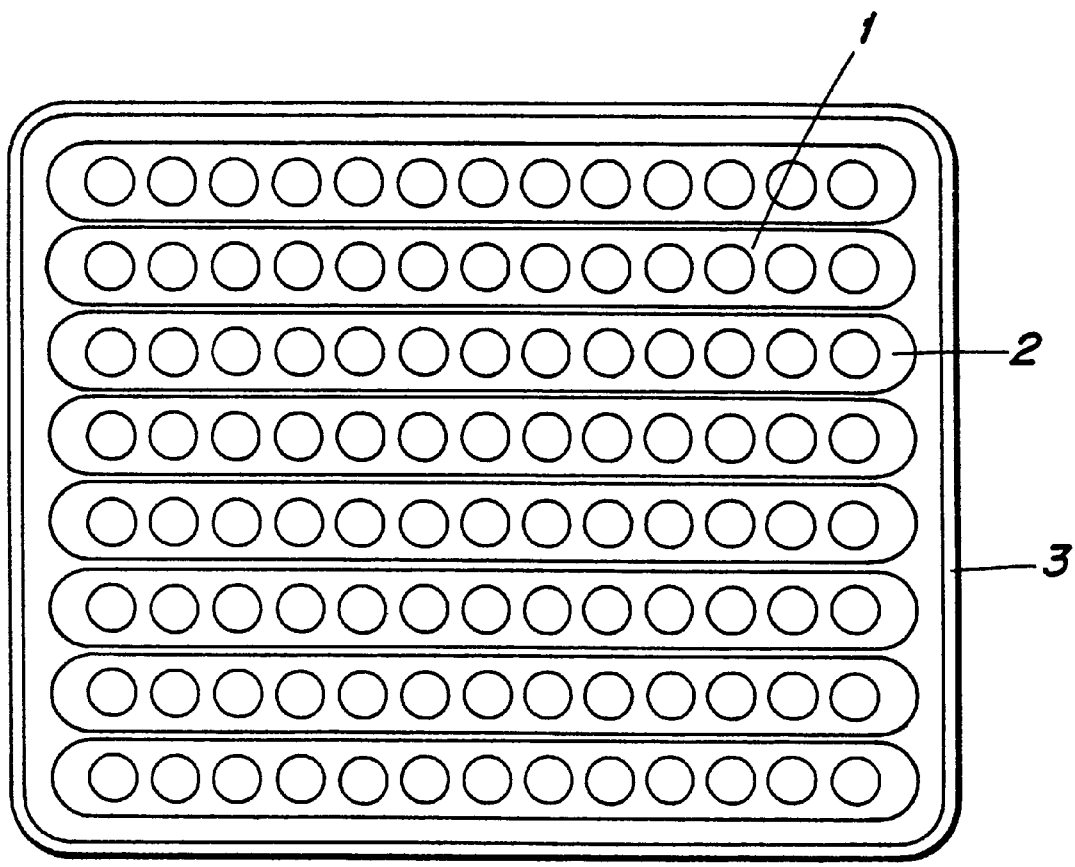
FIG. 1 is a cross-sectional view of an optical fibre ribbon cable body embraced by elastic tape in accordance with the invention.

FIG. 1 is a cross-sectional view of an optical fibre ribbon cable body 1 that comprises eight mutually combined twelve-fibre ribbons 2, that is to say ninety-six optical fibres arranged in eight mutually stacked optical fibre ribbon cables, each containing twelve optical fibres. The fibre ribbon cables have been placed one on top of the other and are held together by elastic tape 3 wound around the stack, such as to form a cable body. The elastic tape that holds the cables together may be comprised of a polymeric plastic material and is applied helically with a pitch at which a 50 percent overlap is obtained, for instance. The tape may include an adhesive region, so that the tape will adhere to itself in the overlap regions. The tape shall not be wound too tightly, and shall allow a certain amount of longitudinal movement between mutually adjacent tape turns, so that when the cable body is blown into a duct bend, the body will be able to accumulate tape surpluses in those tape sections that become compressed. The tape may be of a swellable kind that will inhibit water penetration and limit such penetration in the event of any leakage in the duct.

Figure 2:
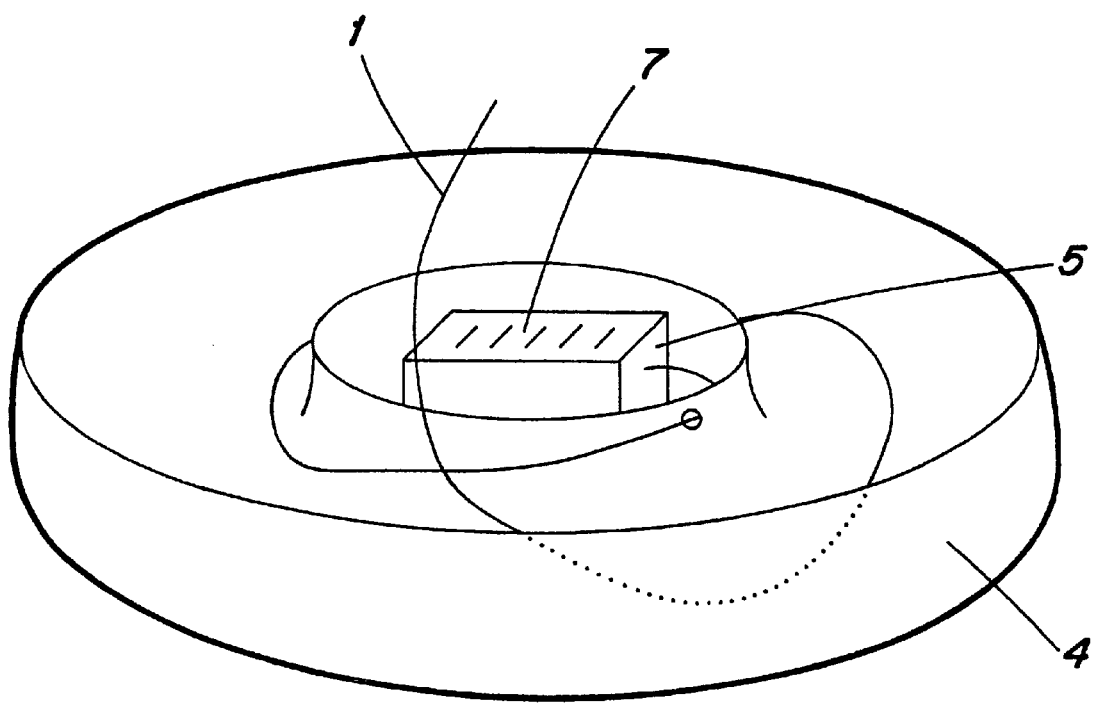
FIG. 2 is a simplified illustration showing coiling of an optical fibre ribbon cable body in accordance with the invention.

FIG. 2 illustrates how an optical fibre ribbon cable body 1 is coiled to form a reel having a diameter of about 75–100 cm in a basket-like container 4 with core. The cable body is automatically twisted through 360 degrees with each turn. This twisting of the cable body results in a relative balance with respect to the length of the fibre content in each turn, and when the cable body is later fed into a duct, e.g. blown thereinto, the cable body will return to its original state prior to being coiled, causing the twist in the cable body to disappear.

Subsequent to having wrapped and coiled an appropriate length of cable body, the cable body 1 is provided with an electric contact device 5 for each fibre ribbon at the end of said body where taping was commenced, a so-called MT device. The other end of the cable body is fitted with a sleeve 6 which preferably has a rounded top and which is, e.g., glued to said end. The sleeve-fitted end of the cable body is intended to be blown into or otherwise fed into an existing duct and, after removing the sleeve, is spliced in a splicing box or cabinet with which the duct connects. The electric contact devices on the other end of the cable body can be mounted in a panel unit 7 which, in turn, is mounted in a stand, frame or similar structure either prior to installation or in conjunction therewith.

The duct into which such a cable body is to be blown will preferably have low internal friction, in other words a low-friction inner surface, and an internal diameter which is substantially greater than the diameter of the cable body. The cable body shall also be taped in a manner such that the tape turns terminate at that end of the cable body which enters the duct first, i.e. the leading end. In the illustrated and described case, the cable body has a width of about 5 mm and a suitable duct will have a smallest inner diameter of at least 8 mm and a determined smallest bend radius of 20 times the diameter of the duct. The wall thickness is preferably balanced so as to obtain good protection, for instance a thickness of 1.0 mm.

Since the duct involved are normally very short, the cable body can be fed into the ducts manually in the majority of cases. In the case of lengths greater than 50 m, it may be simpler to use blowing equipment, wherewith the edges of the helically wound tape increase the resistance to air flow. The effect obtained can be likened to a fish scale effect which imparts favourable blowing properties to the cable body. Subsequent to having blown or fed an intended length of cable body into the duct, the panel unit for connection of the electric contact devices fitted on end of the cable body is mounted in a stand or frame that includes optically active equipment.

Figure 3:
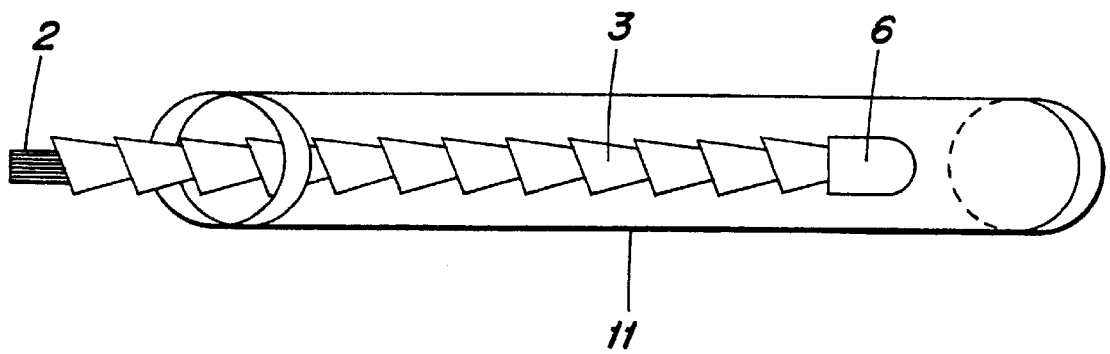
FIG. 3 is a simplified illustration showing the inventive optical fibre ribbon cable body positioned in a duct, and also shows the elastic tape wound helically around said body.

FIG. 3 illustrates part of a duct 11 which encloses an optical fibre ribbon cable body that has a sleeve 6 fitted to one end thereof. FIG. 3 also shows the tape 3 wound helically around the combined optical fibre ribbons 2 forming the optical cable body 1.

Figure 4:
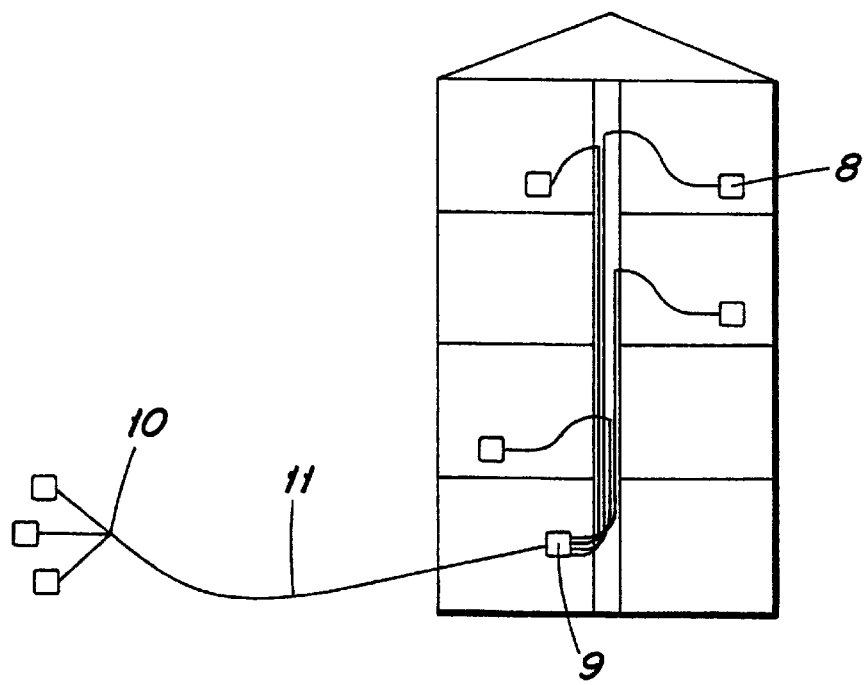
FIG. 4 is a simplified illustration of a system for using optical fibres which may include the helically wrapped optical fibre ribbon cable body according to the invention.

FIG. 4 illustrates a low-cost optical fibre installation in an apartment building. Each apartment in the building is provided with an optical fibre connecting point 8. The optical fibre cables are drawn between each apartment and a centrally located collecting point 9. The afore-mentioned optical fibre ribbon cable body 1 is installed in a duct 11, between said collecting point 9 and a further collecting point 10. The cable body can be readily placed in the duct with the aid of compressed air, as a result of the coaction of the outwardly projecting cross surface of the helically wound tape with the by-passing air stream. In practice, the end 6 of the cable body provided with said sleeve is fed into the duct 11 with the aid of compressed air while the cable body 1 is coiled in the basket 4, wherewith the helically wound and outwardly projecting cross surface provided on the cable body by the tape 3 imparts effective forward blowing properties to said cable body. The cable body is connected to the panel unit in the centre of the basket and the ends of the fibre ribbon cables are pre-fitted with electric contact devices for simple connection to a connecting unit.

It will be understood that the invention is not restricted to the aforedescribed and illustrated exemplifying embodiments thereof and that modifications can be made within the scope of the following claims.

What is claimed is:

1. A method of installing in a duct optical fibre cable elements, said method comprising the steps of:

combining a plurality of optical fibre ribbon cables to form an optical multi-fibre cable element; and winding tape helically around the optical multi-fibre cable element with an overlap between successive tape turns so as to form a helical cross-surface that coacts with a flowing medium to drive the optical multi-fibre cable element forward along the duct.

2. Optical fibre cable arrangement for use in ducts comprising:

an optical fibre cable element including a plurality of optical fibres; and tape, wherein the tape is helically wound around the optical fibre cable element with mutually overlapping turns to form a helical cross-surface that will coact with a flowing medium in driving the element forwards in the duct.

3. The cable arrangement according to claim 2, wherein the optical fibre cable element is comprised of optical fibre ribbon cables that are stacked one upon the other and held together by the tape wound around the cables so as to form an optical fibre ribbon cable body.

4. The cable arrangement according to claim 2, wherein the tape (3) is elastic.

5. The cable arrangement according to claim 3, further comprising a sleeve, wherein a first end of the cable body is provided with the sleeve which has a rounded end and wherein a second end of the cable body is provided with electric contacts.

6. The cable arrangement according to claim 3, further comprising a basket having a panel unit, wherein the cable body is coiled-up in the basket with the second end connected to the panel unit in the centre of the basket and with the first end of the cable body being free to enable the cable body to be fed out from the basket.

7. The cable arrangement according to claim 6, wherein the cable body is coiled with a 360-degree twist, and wherein the cable body untwists as it is fed out from the basket.

8. The cable arrangement according to claim 2, wherein the tape is swellable to prevent water penetration.

\* \* \* \* \*